United States Patent [19]

McElroy

[11] 4,309,165

[45] Jan. 5, 1982

[54] HIGH VELOCITY COMBUSTION FURNACE AND BURNER

[76] Inventor: James G. McElroy, 175 Timbermill, Woodlands, Tex. 77380

[21] Appl. No.: 31,333

[22] Filed: Apr. 18, 1979

[51] Int. Cl.³ .............................................. F23C 5/08
[52] U.S. Cl. ...................................... 431/8; 431/181; 239/424.5; 239/426; 239/431
[58] Field of Search ..................... 431/8, 90, 354, 166, 431/167, 178, 179, 181, 187, 188, 162, 182–184; 239/426, 429, 431, 432, 434, 424.5

[56] References Cited

U.S. PATENT DOCUMENTS

| Re. 28,665 | 12/1975 | Zagoroff | 431/347 |
|---|---|---|---|
| 1,302,819 | 5/1919 | Lucke . | |
| 1,308,364 | 7/1919 | Lucke . | |
| 2,440,491 | 4/1948 | Schwander . | |
| 2,511,380 | 6/1950 | Stadler . | |
| 2,975,047 | 3/1961 | Leroy et al. . | |
| 2,987,118 | 6/1961 | Brown . | |
| 3,001,576 | 9/1961 | Biber et al. . | |
| 3,186,040 | 6/1965 | Adamo et al. . | |
| 3,188,366 | 6/1965 | Flynn . | |
| 3,208,247 | 9/1965 | Weil et al. . | |
| 3,232,593 | 2/1966 | Flynn . | |
| 3,291,472 | 12/1966 | Hoff . | |
| 3,299,940 | 1/1967 | Phillips et al. | 431/90 |
| 3,358,979 | 12/1967 | Flynn . | |
| 3,377,024 | 4/1968 | Nutten et al. . | |
| 3,644,076 | 2/1972 | Bagge | 239/424.5 |
| 3,663,153 | 5/1972 | Bagge et al. . | |
| 3,676,048 | 7/1972 | Sellors et al. . | |
| 3,695,817 | 10/1972 | Sharah | 431/178 |
| 3,726,634 | 4/1973 | Thomson et al. | 239/424.5 |
| 3,736,094 | 5/1973 | Shisler | 431/158 |
| 3,741,710 | 6/1973 | Nelson | 431/90 |
| 3,749,548 | 7/1973 | Zink et al. | 431/158 |
| 3,782,881 | 1/1974 | Feeney | 431/90 |
| 3,998,581 | 12/1976 | Hemingway et al. | 431/158 |
| 4,003,692 | 1/1977 | Moore | 431/158 |
| 4,012,189 | 3/1977 | Vogt et al. | 431/353 |
| 4,033,512 | 7/1977 | Beck | 239/423 |
| 4,067,682 | 1/1978 | Lado | 431/162 |
| 4,218,212 | 8/1980 | Eschenberg et al. | 110/336 |

OTHER PUBLICATIONS

Bulletins (44.22 11/74), (44.42 11/73), (46.82 10/75), (10.01 7/61), (72.18 3/72), (10.01, 10.02, 10.69, 10.12 6/74), (18.07 8/73), (70.52 10/75), (30.65, 5/75) by North American Mfg. Co., 4455 E. 71 St. Cleveland, OH 44105.
Bulletins (H-44-1 5/75) and (M-400 3/74) by Eclipse Combustion Div. of Eclipse Inc. Rockford, Il 61101.

*Primary Examiner*—Carroll B. Dority, Jr.
*Attorney, Agent, or Firm*—David Alan Rose; Ned L. Conley; Murray Robinson

[57] ABSTRACT

In accordance with the teachings of the invention, the combustion system includes a combustion chamber, hearth, burners, and an air/fuel control system. The control system controls a pressurized air supply, a regulated gas supply, and means for regulating the gas supply as a function of the air pressure. The burner includes an air manifold within which is housed an air control orifice telescoped in a gas manifold and a diffuser inserted within the air control orifice for mixing the air and gas and causing turbulence of the air/gas mixture. The diffuser protrudes through an aperture in the air manifold for communication with a juxtaposed combustion chamber and hearth having a flue gas outlet. Regulated air and gas are supplied to the air manifold and gas manifold respectively and are preheated. The pessurized preheated air passes through a throat and nozzle created by the diffuser and air control orifice creating a low pressure area at ports communicating with the gas manifold. The preheated gas passes from the high pressure area to a lower pressure area through the ports and into the throat. There the gas mixes with the air and passes through the nozzle by turbulent flow where it is ignited. The combustion air is sufficiently pressurized to create a flue gas velocity sufficient to cause a back pressure within the combustion chamber. The combustion chamber may have a very small volume and several nozzles may be housed in a common air manifold. The invention is simple, fuel efficient and reduces heat treat time.

31 Claims, 5 Drawing Figures

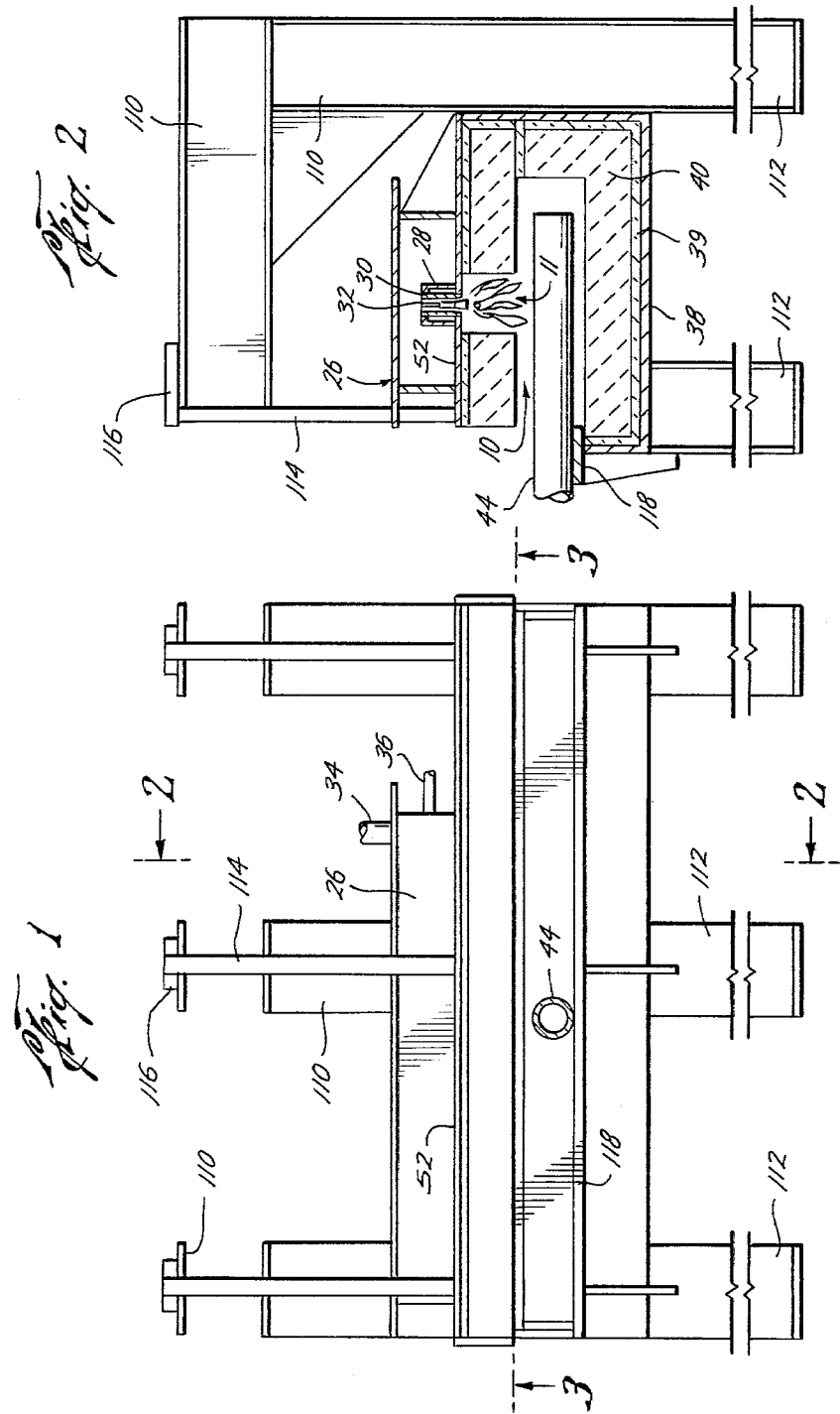

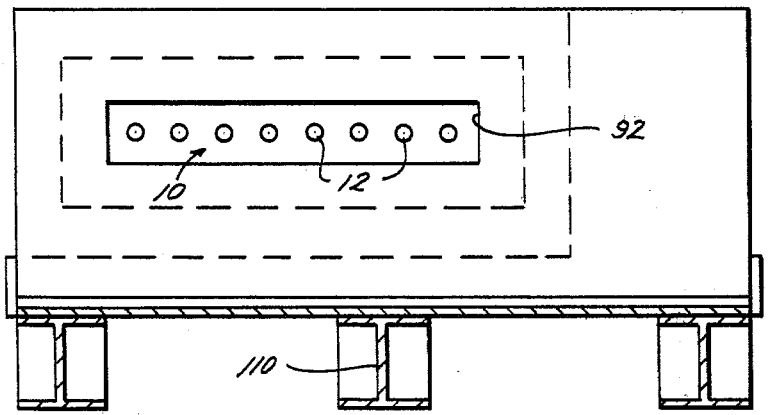
Fig. 3
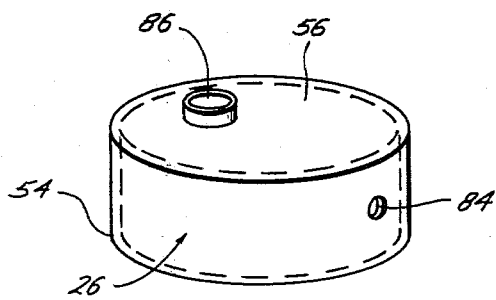
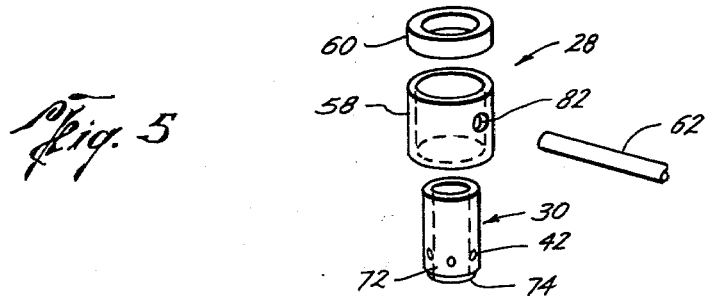
Fig. 5
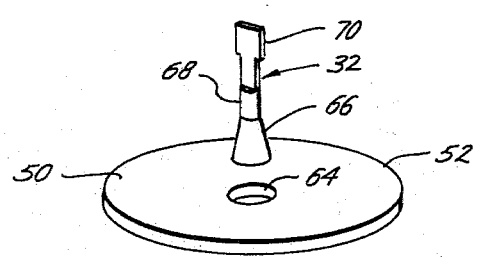

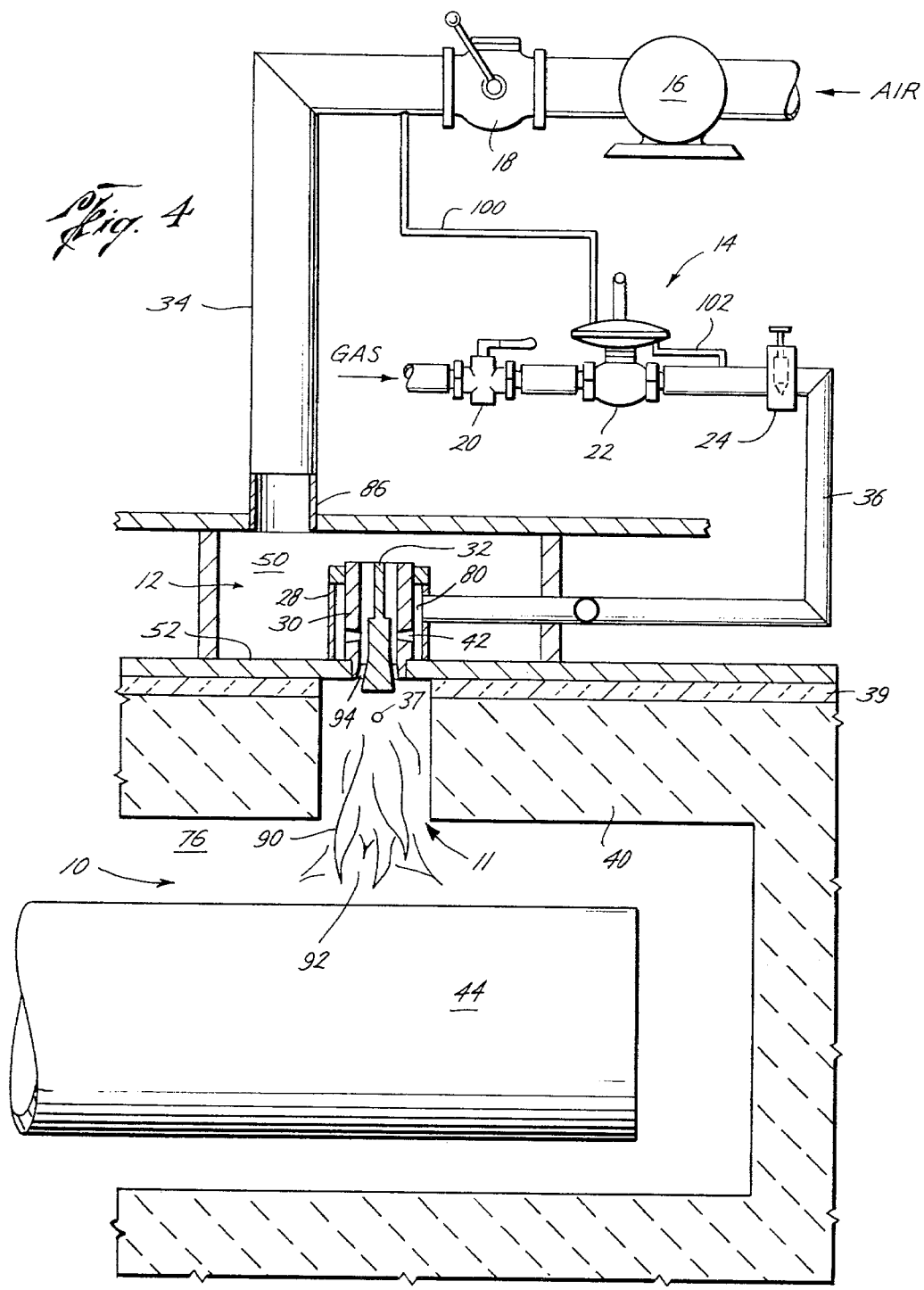

HIGH VELOCITY COMBUSTION FURNACE AND BURNER

TECHNICAL FIELD

This invention pertains to fuel combustion furnaces, and more particularly to systems suitable for use with high pressure combustion air and high velocity flue gas.

BACKGROUND ART

Most forge furnaces have a flue gas velocity of 50 feet per second with a maximum air pressure of 8 inches water column. By operating at such low pressures and velocities, the heat treat time for a given work piece is severely extended thereby increasing fuel consumption drastically.

In walking beam, rotary hearth, barrel type conveyorized endo feed, billet, annealing, and normalizing furnaces, the burners rely primarily on radiant heating and only secondarily upon forced convection. Since the rate of heat transfer by radiation is fixed, the heat transfer per time is also limited in such prior art furnaces.

The prior art burners are extremely complex and have multiple parts. Also, a large pressure drop occurs between the air blower and burner nozzle. Such a pressure drop is necessary in prior art burners to permit adequate control. The nozzle mix burners of the prior art are not able to achieve the small combustion chamber space and air/gas atom mixture of pre-mix systems.

Eclipse and North American both manufacture a relatively high velocity burner. Their burners operate at a back pressure of approximately 8 inches water column in the combustion chamber. Although such burners can operate at a velocity of 500 feet per second, their design is not conducive to mounting multiple burners in a common manifold combustion block or to controlling multiple burners with one control system. Such burners require individual controls for each burner and each burner is required to have its own air manifold, ignition system, and flame scanner. Such systems require an excessive size of combustion chamber thereby requiring additional heat.

High velocity burners which have a low fire position operate in an excess air mode which may or may not be suitable for a particular customer. Such systems have an auxiliary air source not regulated by the air/gas mixtures whereby as the air/gas mixture is turned down, such burners become oxidizing or an excess air burner.

The invention overcomes these defects in the prior art combustion systems and burners.

SUMMARY OF THE INVENTION

In accordance with the teachings of the invention, the combustion system includes a combustion chamber, hearth, burners, and an air/fuel control system. The control system controls a pressurized air supply, a regulated gas supply, and means for regulating the gas supply as a function of the air pressure. The burner includes an air manifold within which is housed an air control orifice telescoped in a gas manifold and a diffuser inserted within the air control orifice for mixing the air and gas and causing turbulence of the air/gas mixture. The diffuser protrudes through an aperture in the air manifold for communication with a juxtaposed combustion chamber and hearth having a flue gas outlet. Regulated air and gas are supplied to the air manifold and gas manifold respectively and are preheated. The pressurized preheated air passes through a throat and nozzle created by the diffuser and air control orifice creating a lower pressure area at ports communicating with the gas manifold. The preheated gas passes from the high pressure area to the low pressure area through the ports into the throat. There the gas mixes with the air and passes through the nozzle by turbulent flow where it is ignited. The combustion air is sufficiently pressurized to create a flue gas velocity sufficient to cause a back pressure within the combustion chamber. The combustion chamber may have a very small volume and several nozzles may be housed in a common air manifold. The invention is simple, fuel efficient and reduces heat treat time.

BRIEF DESCRIPTION OF THE DRAWINGS

FIG. 1 is an elevation view illustrating the furnace;

FIG. 2 is a section taken along the line 2—2 in FIG. 1;

FIG. 3 is a section taken along the line 3—3 in FIG. 1;

FIG. 4 is a schematic of a fragmentary view of FIG. 2 and includes a schematic of the control system; and FIG. 5 is an exploded view of an air manifold having a single nozzle.

DESCRIPTION OF THE PREFERRED EMBODIMENT

FIGS. 1, 2, and 3 illustrate the overall furnace. Referring initially to FIG. 4 showing a portion of FIG. 2, the combustion system includes a furnace hearth 10, a combustion chamber 11, burners 12, and an air/fuel control system 14. The control system 14 generally includes an air supply (not shown), an air blower 16, an air valve 18, a fuel supply (not shown), a fuel cutoff valve 20, a regulator 22, and a fuel needle valve 24. A burner 12 generally includes an air manifold 26, a gas manifold 28, an air control orifice 30, and a diffuser 32. The air manifold 26 is connected to the air supply by air line 34 and gas manifold 28 is connected to the gas supply by gas line 36. An appropriate ignition system and flame scanner, such as at 37, would also be provided in any standard system. The hearth 10 shown in FIG. 2 includes a housing 38 lined with insulation 39 and refractory 40.

The system generally operates by air blower 16 providing air manifold 26 with pressurized combustion air which flows through air control orifice 30 and by the gas supply flowing gas into gas manifold 28 and through gas inlet ports 42 into air control orifice 30 where the gas and air are mixed in throat or nozzle 94 by diffuser 32 for burning inside combustion chamber 11 to heat work pieces such as shown at 44.

Referring now to FIG. 5 for a detailed description of a typical burner 12, burner 12 includes only 4 principle parts, namely the air manifold 26, gas manifold 28, air control orifice 30, and diffuser 32. FIG. 5 illustrates burner 12 with a single nozzle 94 housed within a tubular air manifold. It can easily be appreciated that the air manifold may have various configurations. In the preferred embodiment shown in FIGS. 1, 2 and 3, air manifold 26 is rectangular box shaped housing 8 nozzles. Mounting plate 52, tubular sides 54, and cover plate 56 form air manifold 26 and air chamber 50. Gas manifold 28 includes a tubular body 58, a collar 60 and a gas supply pipe 62. Mounting plate 52, diffuser 32, and air control orifice 30 are all made of stainless steel. The tubular body 58 and collar 60 of gas manifold 28 are preferably made of stainless steel but may be made of carbon steel. Gas delivery pipe 62 and tubular sides 54 and cover plate 56 of air manifold 26 are made of carbon steel.

All parts of burner 12 may be made on a small lathe or milling machine with a minimum of welding required. The assembly has been reduced to only eight parts to make fabrication easier and less expensive. All castings have been eliminated.

Mounting plate 52 is a single unit providing various functions including a cover for air manifold 26, a bottom for combustion chamber 10, a means for mounting and assembling the other parts of burner 12, a heat transfer surface, and a means for absorbing noise. Mounting plate 52 may have various configurations such as circular, rectangular, square, etc. Compare FIGS. 2 and 5. Although the size of mounting plate 52 is not critical, it must be large enough to provide a sufficient heat transfer surface area to sufficiently preheat the combustion air in air chamber 50 as hereinafter discussed in more detail. Mounting plate 52 will include one or more apertures 64 for receiving diffuser 32 depending upon the number of burners required. Although burner 12 shown in FIG. 2 only provides an aperture for one burner, it may be of rectangular length to provide apertures for numerous burners such as shown in FIGS. 2 and 3.

Diffuser rod 32 is made of a solid piece of stainless steel and includes a flared downstream tip 66, a rod-like mid-portion 68 and a flattened upstream end 70. Diffuser rod 32 has a length greater than the length of air control orifice 30 and protrudes through aperture 64 beyond the chamber side of mounting plate 52 into combustion chamber 11.

It is preferable that diffuser rod 32 be made from a single piece of stainless steel and not be welded together. Further, it is preferable that diffuser rod 32 not be welded to mounting plate 52 since the extreme heat from combustion chamber 11 causes welds to melt or break. By having a single integral rod, it can be projected and welded back up in air manifold 26 away from chamber 11 where the temperature is not as great.

It is preferable that the diffuser 32 be made of stainless steel or some other material high in nickel and low in iron content. Excellent heat resistant materials are readily available in the market place for use in such a high heat application. It is also preferable that such material be low in scaling and in oxidation. If such materials are not used, rod 32 will burn up from the severe heat of flame 90.

Combustion air passing through orifice 30 along diffuser rod 32 during operation keeps the rod cool even though the flange 90 is located next to the chamber side of mounting plate 52 when the air pressure is very low thus greatly elevating the temperature of mounting plate 52. The air flowing across rod 32 lowers its temperature thereby adding to its life.

Air control orifice 30 is tubular with a flaring internal diameter at its downstream end 72. The internal diameter of air control orifice 30 is large enough to slidingly engage the edges of flattened end 70 of diffuser 32. Such sliding engagement permits diffuser 32 to be welded to air control orifice 30 at its upstream end. Shoulder 74 is machined onto the outer periphery of the downstream end of orifice 30 for sliding insertion into aperture 64 of mounting plate 52. Shoulder 74 has a depth equal to the thickness of mounting plate 52 to permit the downstream end of orifice 28 to be flush with the combustion chamber side of mounting plate 52. The length of orifice 30, between the upstream end and shoulder 74, is slightly longer, as for example $\frac{1}{8}$ inch, than the length of gas manifold 28 thereby causing orifice 30 to protrude outside of collar 60 as shown in FIG. 1. Taper 72 has a length of approximately 1 inch or less, preferably $\frac{5}{8}$ inch, and has the same pitch as the exterior taper of the flared downstream end 66 of diffuser 32. Both tapers 72 and 66 begin at approximately the same point upon assembly.

The internal diameter and taper of orifice 30 are machined or drilled out and sized to deliver a calculated amount of air for providing a given number of BTUs of heating by burner 12 during the combustion process. The sizing of an air orifice is well known to one skilled in the art.

The gas inlet ports 42 are azimuthally spaced around the periphery of orifice 30. Although there may be any number of ports 42, there is preferrably eight. Orifice 30 is sized in relation to the flue gas exit 76, hereinafter described and discussed in detail, and ports 42 are sized to provide ample flow of gas into the air stream through orifice 30.

Tubular portion 58 and collar 60 of gas manifold 28 have the same outside diameter. The internal diameter of tubular portion 58 is sufficiently larger than the outside diameter of air control orifice 30 to form a gas chamber 80 shown best in FIG. 1. An aperture 82 is provided in the side of tubular portion 58 to receive gas supply line 62 for connection thereto. Collar 60 includes an aperture for slidingly receiving the upstream end of air control orifice 30.

It is preferable to make tubular portion 58 and collar 60 in two pieces to avoid waste. Since each of them require different internal diameters, waste can be avoided by utilizing pipes with different internal and external diameters. If manifold 28 were made from one pipe, it would be necessary to machine a large internal diameter for tubular portion 58 thereby creating waste and increasing machine time.

The side portion 54 of air manifold 26 has outside dimensions equal to the outside dimensions of mounting plate 52 for welding engagement thereto. Air manifold 26 includes an aperture 84 for receiving gas supply line 62 upon assembly and an aperture 86 for connection to air supply line 34 such as is schematically shown in FIG. 4. Aperature 86 is shown in FIG. 4 located in cover plate 56 but is preferably in side portion 54 illustrated in FIG. 1. Mounting plate 52 and cover plate 56 are welded to the ends of tubular side portion 54 to form air manifold 26.

Air manifold 26 is sized according to the amount of preheat desired for the combustion air. As discussed previously, mounting plate 52 acts as a heat transfer surface to heat the combustion air in air chamber 50. It is preferable that mounting plate 52 be of a size sufficient to preheat the combustion air to at least 300° F. and preferably 500° F. Where the combustion side of mounting plate 52 is lined with insulation 39 and refractory 40, the heat transfer surface of mounting plate 52 must be larger than if no such refractory lining existed since the insulation 39 and refractory 40 hinders the conductivity of the heat from the flue gas to the combustion side of mounting plate 52. Where no insulation or refractory is on the combustion side of mounting plate 52, the dimensions of mounting plate 52 may be substantially smaller. Thus, the dimensions will vary in accordance with the application of the burner. A quarry burner, for example, might have a mounting plate diameter of approximately 3½ inches where an industrial furnace, having a refractory lining, might require a diameter of 12 inches. The depth of air manifold 26 is generally between 4 to 8 inches. It should also be noted that mounting plate 52 transfers heat by conduction to diffuser 32, air control orifice 30, gas manifold 28, and the sides 54 and cover 56 of air manifold 26.

The flame 90 shown in FIG. 1 begins at nozzle 94 on the flared portion 66 of diffuser 32 and projects away from the combustion side of mounting plate 52 for several inches depending upon the air pressure maintained in the air manifold 26.

In assembling burner 12, air control orifice 30 is inserted into collar 60 and welded thereto. The tubular body 58 of gas manifold 28 is then placed over air control orifice 30 and welded to collar 60. Diffuser rod 32 is then inserted into orifice 30 with its flattened upstream end 70 welded to the upper end of orifice 30. Gas supply line 62 is welded to tubular portion 58 at aperture 82 and then the assembly is inserted into side portion 54 of air manifold 26 by inserting gas line 62 through aperture 84 and welding it thereto. The cover plate 56 may be welded to sides 54 either before or after the insertion of the assembly. Mounting plate 52 is then welded to the downstream side of air control orifice 30 and to tubular portion 54.

Referring to FIG. 4 and the operation of burner 12, combustion air is passed from air line 34, through inlet 86, and into air chamber 50, and impinges on mounting plate 52 where heat is transferred to the air. The pressure on the preheated air forces it into the upstream end of air control orifice 30 and the air deflects on diffuser rod 32. Diffuser rod 32 creates extreme air turbulence within air control air orifice 30 preventing the air from passing through orifice 30 by laminar flow. The flow of the pressurized, preheated combustion air through air control orifice 30 occurs at a high velocity creating an aspirating effect on gas inlet ports 42. In other words, the high velocity air flow across ports 42 creates a low pressure area causing the higher pressure gas in gas chamber 80 to flow into orifice 30.

Natural gas is supplied to burner 12 by gas line 36 which is connected to line 62 of burner 12. The gas flows into gas manifold 28 where it is preheated by heat transfer from manifold 28 and orifice 30 which are heated by conduction by mounting plate 52. The aspiration created at gas inlet ports 42 causes the gas to flow through ports 42 as it moves towards the low pressure area. In essence the gas is sucked through ports 42 for mixing with the combustion air. The gas impinges upon central portion 68 of diffuser 32 causing turbulence. The gas becomes entrained in the air and a slave to the air as the air passes through the throat and nozzle 94 created air control orifice 30 and diffuser 32. The flared portion 66 of diffuser rod 32 creates further turbulence of the air/gas mixture and causes the mixture to leave the burner in a fan shaped pattern where it is burned by flame 90.

Preheating the combustion air and gas to the point of self ignition, using mounting plate 52 as a heat transfer agent, substantially increases the efficiency of the burner. Preheating the combustion air to at least 300° F., and preferably to 500° F., prior to ignition lowers the amount of fuel required for a given available amount of heat in combustion chamber 11. Further, preheating the combustion air permits burner 12 to burn the air/gas mixture faster and to obtain higher temperatures.

The gas manifold 28, air control orifice 30, and air manifold 26 are all air tight to prevent any mixture of the natural gas with the combustion air prior to the throat and nozzle 94 formed by diffuser 32 and air control orifice 30. By preventing any premature mixing of the gas with air, there can be no explosion, backfire, or burn back since there is no oxygen for the gas to burn. Thus, burner 12 is of a very simple design which avoids the problems of the prior art.

The cross-sectional area of the flue gas exit 76 must be approximately eight times larger than the cross-sectional area of air control orifice 30 due to the increase in flue gas volume. The specific gravity of air is 1.0 and natural gas is 0.6, but at these elevated temperatures, the specific gravity of air becomes less than 1.0 and therefore the flue gas volume is slightly less than eight times the volume of the air/gas mixture. Thus, it is important to have the air control orifice 30 large enough to permit free flow of the flue gas out exit 76, or otherwise the velocity is reduced at exit 76.

Although the area of air control orifice 30 must have some minimum size to assure the exiting of the flue gas at 76, the flow of the gas through the system may be regulated by the limiting orifice needle valve 24, hereinafter described, to prevent the sizing of ports 42 from becoming critical. Thus the flow of gas through the system can be further regulated by the limiting orifice needle valve 24.

To achieve maximum efficiency of burner 12, there must be turbulent flow of the air/gas mixture through the throat and nozzle 94. Thus, the shape of the throat has been designed to maximize the turbulence of the air and gas flow through orifice 30. Such turbulence enhances the mixture of the gas atoms and air atoms. The turbulence is created by the air and gas trying to rush back into the middle of orifice 30 to fill voids. The aspiration effect also assists in creating turbulence in orifice 30. The flared portion 66 of rod 32 maintains pressure on the gas/air mixture for a short distance after the mixture passes ports 42.

Referring now to FIGS. 1, 2, and 3 and the overall furnace, housing 38 is of an elongate, rectangular shape with mounting plate 52 of burner 12 forming the top thereof. Housing 38 is mounted on steel frame 110 and legs 112 and is lined with insulation 39 and refractory 40. Air manifold 26, burners 12, and combustion blocks 11 are cantilevered over hearth 10 and supported by rods 114 suspended from hanger pads 116. Pipe roll rail 118 supports work pieces 44. In the present embodiment, a side exit 76 is disposed in housing 38 to permit the work pieces 44 to extend into the hearth 10 and the escape of flue gases created from the burners 12 in combustion chamber 11. The hearth 10 is approximately 4 feet long, 12 inches wide, and 18 inches deep and provides for a plurality of burners 12 such as are shown in FIG. 3. The refractory 40 mounted on the combustion side of mounting plate 52 is about 3 inches thick and includes rectangular slot 92 forming combustion chamber 11 for the flames and flue gas from the plurality of burners 12.

Referring now to FIGS. 2 and 4, work pieces 44 include a row of pipe sections with their ends protruding through exit 76 and into hearth 10. The pipes 44 are rolled along a rack using a chain conveyor (not shown) so that the ends of the pipe are being subjected to the flue gas from the burners 12 as the pipe rolls through the hearth 10.

The burning of the air/gas mixture by flame 90 creates flue gas. Where the velocity of the flue gas through combustion chamber 11 is great enough, the flue gas creates a back pressure against flame 90.

The flue gas heats the ends of work pieces 44 by forced convection. The flue gases also heat refractory 40 and refractory 40 then further heats the ends of work pieces 40. Thus, approximately 75 percent of the heating of work pieces 44 is by forced convection and the remainder is by radiation from refractory 40.

Radiant heat only travels at a given rate and it cannot be made to travel any faster. Where radiation is used as the primary means of heat transfer from the combustion chamber to the work pieces, it is necessary to first heat the refractory which will in turn heat the work piece at a specific rate. Therefore, if the refractory has a temperature of 2300° F. and a work piece is located a certain distance from the refractory, it will take a given length of time before the work piece is heated to 2300° F. and little can be done to enhance the rate of heat transfer.

The present invention reverses the prior art systems by relying primarily on forced convection heating. The advantage of convection heating is that everytime you double the velocity of the flue gas you increase the heat transfer ratio by eight times. Fuel savings occur because of the higher rate of heat transfer using forced convection. Thus forced convection heating reaches the work directly and only secondarily does the invention rely upon radiation from the surrounding refractory.

In an alternative embodiment, work pieces 44 may be rolled through the combustion chamber rather than over it. The velocity of the flue gas around the work pieces creates substantially the same back pressure as did combustion chamber 11 in the preferred embodiment. The flue gases heat the work pieces 44 by forced convection. The refractory may be eliminated altogether.

Although it is preferable to have back pressure to enhance heat transfer, it is not essential to the working of the burner to have a back pressure. The burner is designed to be operable with an open combustion block where no refractory is used or back pressure. In such a case, the combustion chamber is eliminated and the work piece moves directly over the burners.

Referring again to FIG. 4, the air/gas control system 14 includes a butterfly air valve 18, an air blower 16, a limiting orifice needle valve 24, a proportionator or regulator 22, and a gas cock 20. It should be understood that anyone or all of these may be electrically controlled or motorized. Further, it should be understood that this single control system will provide the air and fuel for all of the burners shown in FIG. 3 and it is not required or desirable to have an individual control system for each burner.

In this control system the air pressure will automatically control the gas pressure after needle valve 24 is properly adjusted. Top load line 100 connects air line 34, downstream of valve 18, with regulator 22, which may be of the Rockwell Zero Governor type. Regulator 22 includes a diaphragm which is spring loaded on top and on bottom. The regulator is designed to provide atmospheric pressure downstream without regard to the upstream pressure of the gas. By also placing air pressure on the top side of the diaphragm by means of top load line 100, and using limiting orifice needle valve 24 to adjust the air/gas mixture in burner 12, the air/gas mixture will thereafter be responsive to the air pressure in supply line 34 since the regulator 22 will be responsive to the air pressure and will increase or decrease the gas flow through gas line 36. Thus, the control of the air pressure will automatically control the gas pressure through the use of regulator 22 after the initial calibration of the system using needle valve 24.

Limiting orifice needle valve 24 is only used to calibrate the flow of gas in relation to the air pressure through air control orifice 30. This provides a setting point for the operation of the burner using regulator 22. Regulator 22 may or may not have an internal feed back line (not shown) to balance the downstream pressure of the regulator with the air pressure from top load line 100. If an internal feed back line is not included, then it is necessary to install a back pressure feed line 102 on the downstream side of regulator 22.

Air blower 16 may pressurize the combustion air anywhere from ¼ inch of water column to over 125 psi. Since the velocity of air flow through air control orifice 30 is directly proportional to the pressure on the gas caused by the venturi effect at inlets 42, a change in the air pressure will cause a corresponding change in the gas pressure for mixing purposes in burner 12. Since the velocity is directly proportional to the air pressure in air manifold 26, it is only necessary to control the air pressure to also adjust flue gas velocity and pressure in combustion chamber 11. As discussed previously, with the gas being a slave to the air, the air pressure will also control the gas pressure. Thus, the furnace system is completely responsive to the air pressure placed on the system by blower 16. Burner 12 may operate at over 100 psi air pressure which causes the flue gas to have a velocity of approximately 5000 feet per second.

Burner 12 has three different modes (1) oxidizing (excess air), (2) stoichiometric (standard ratio), and (3) rich (excess fuel). The present system will operate in any of these three modes within plus or minus 20 percent of fuel from the stoichiometric point. Although the system may operate past those limitations, excessive noise will be created. Thus, control system 14 sets the ratio of gas to air in burner 12 so that the burner may run lean, stoichiometric, or rich. The different modes will operate over the full firing range of burner 12 and the firing range is only limited by the amount of pressure which can be placed on the combustion air.

The furnace system of the invention permits all the burners to be manifolded together and can be operated by one ignition system for igniting all the burners. Further, only one flame scanner is required. Thus the present system requires less maintenance, less installation, and is less expensive to manufacture.

Flue gas velocities are measured at a point where combustion is essentially complete such as at the flue gas exit of the combustion chamber as for example exit 76 of hearth 10. Most forge or heat-treat furnaces have a combustion air pressure of approximately 8 inches water column and operate high fire with maximum air pressure at a flue gas velocity of 40 to 60 feet per second. It is desirable to operate at the highest flue gas velocity permitted by the combustion block design since when you double the flue gas velocity you increase the heat transfer ratio by 8 times.

To obtain 1050 BTU's from burning a natural gas/air mixture, the rate of flame propagation is approximately 1.8 feet per second. Maximum flame temperature is approximately 3000° F. and in normal furnace systems, one cannot maintain a flame on the burner where the flue gas velocity is in excess of 200 feet per second.

The number of BTUs that can be provided by a burner is only limited by the air pressure and the design of the combustion block, i.e. refractory. The air pressure can only be increased to the point that back pressure is created which will have an impact on the design of the burner and combustion chamber. Once the combustion air pressure passes 25 psi, the design parameters for the combustion chamber are reversed. At that pressure the velocity of the flue gases pass mach 1 and create a vacuum on the refractory. So long as the flue gas velocity does not pass mach 1, a positive pressure is placed on the combustion chamber. However, once a vacuum is created, it is necessary to redesign the combustion chamber and refractory. Generally, after the air pressure reaches 10 psi, the flame will blow off if there is no back pressure design in the combustion chamber.

Although back pressure does not aid in the rate of heat transfer to a work piece, it does level out the heat within the combustion chamber and hearth and prevent cold spots. A cold spot is caused by a decrease in pressure due to a decrease in the volume of flue gas. By increasing the air pressure to over 1 psi through the use of a 2 pound air blower, you have enough pressure to force the hot flue gas into these cold spot areas. Further, an increase in the flue gas velocity due to an increase in air pressure will increase the turbulence within air control orifice 30 which assists in the efficiency of the burner.

Where the system is operated with a back pressure, one can reduce the cubic volume of space required for combustion chamber 11 and eliminate much of the combustion space required by prior art systems. Only a very small space is needed for a short six inch maximum intense flame thereby permitting the refractory to be closer to the work piece, shortening the heat treat time, and increasing the number of available BTUs for the work pieces.

With a back pressure burner block, a 2 psi air pressure will cause the flue gas to have a velocity of 500 feet per second. The invention obtains an especially good mixture of gas atoms with air atoms using the diffuser, increased turbulence with the diffuser, back pressure, and high velocities to permit the burner 12 to provide heat in excess of 3500° F. due to the increased air pressure which achieves flue gas velocities in excess of 200 feet per second. The use of the air enslaving the gas to keep the flame on the combustion side of mounting plate 52 prevents the mounting plate from overheating.

Flash backs are prevented by mixing the air and gas at the nozzle. If the back pressure is so great that the air cannot flow through air control orifice 30, the aspiration effect at gas inlet ports 42 will cease and the gas will no longer become entrained in the air. Since there is no longer any gas, the flame will go out and the burner will not operate. Thus, you cannot cut the flame to zero without putting the flame out since you no longer have any air or gas flow.

Most systems today have combustion chamber pressures with a maximum of ½ inch water column. The burner of the present invention, however, can increase the air pressure to cause a back pressure in the combustion chamber 10 to 20 times greater than in prior art designs. Further, the air pressure can be increased to over 100 psi with proper combustion block design causing a velocity over mach 1 so as to create a vacuum in the combustion chamber.

Existing combustion systems are advertised to produce one million BTU/hr of heat using a one pound air pressure with a drop of 20 inches water column pressure across the burner and having a pressure of 8 inches water column in a 1728 cubic inch combustion chamber. The present invention can produce five hundred thousand BTU/hr of heat using a hundred pounds air pressure with a vacuum on a nine cubic inch combustion chamber. Thus the invention, by being able to operate at increased air pressures, can produce almost the same heating capacity with a combustion chamber drastically reduced in size—less than one-tenth the size.

As air pressure is increased and a back pressure is created, the design of the combustion chamber and refractory must be properly modified. Where the air pressure is less than about 10 psi, the refractory should be of a type having a high alumina content. High alumina is considered in the trade to be approximately 90 percent or more pure alumina oxide. A refractory with 98 percent purity will operate at a maximum temperature of 3400° F. where a refractory with 60 percent purity is only good for temperatures up to approximately 2600° F. A refractory of 88 percent alumina with a chrome oxide additive is a better refractory where slag is anticipated in the hearth area. The refractory with 88 percent alumina with a chrome oxide additive is a little bit better and provides a little bit longer life at air pressures up to 10 psi.

Where pressure is increased to over 15 psi, but less than 25 psi, the alumina refractory deteriorates. At such pressures and at temperatures in the range of 3400° F., the refractory should be zirconia. Zirconia is an oxidized, stablized zirconium which has good resistance to thermo shock for heating and cooling, but has little resistance to slag, i.e. scale that comes off the work piece during the heating process. The slag turns into a molten state as the carbon burns off and a silica type material remains which erodes zirconia refractory. This generally occurs at elevated temperatures of approximately 4000° F.

Zirconia becomes useless as a refractory where the air pressure is over 25 psi because it loses its adhesive power when placed under vacuum. Such a combination of vacuum and high temperature require that a hafnium oxide refractory be used. That refractory is originally in powder form and is pressed in a vacuum furnace in a graphite mold whereby it is centered together. Between the combination of pressure and heat, it is made into a homogeneous piece.

Thus the burner block or refractory must be modified in accordance with the flue gas velocities through the combustion chamber. As the air pressure increases, the refractories disclosed above become increasingly expensive. Therefore, it is preferable to design a system to meet the particular needs of the customer.

The present invention includes a system using high flue gas velocity, high combustion air pressure, turbulence, back pressuring, and primary forced convection heating using radiant heating only secondarily to provide a system much more efficient than any in the market place today. Further, the invention provides a full range of heating capability and can house a plurality of burners in a single air manifold with the multiple burners all being controlled by one control system.

Changes and modifications may be made in the specific illustrated embodiments of the invention shown and/or described herein without departing from the scope of the invention as defined in the appended claims.

I claim:

1. A burner for burning gas from a gas supply with air from an air source capable of placing the air under pressure in the range of ¼ inch water column to over 100 pounds per square inch, comprising:
   an air manifold connected to the air supply;
   a gas manifold housed within said air manifold, said gas manifold having means for communicating with the gas supply;
   an air control orifice mounted within said gas manifold, said orifice having an inner chamber communicating with said air manifold and a plurality of ports therethrough; and
   a diffuser mounted within said chamber creating a nozzle; said nozzle communicating outside said air manifold.

2. A burner as defined in claim 1 including means for operating the burner at any air pressure between ¼ inch water column and 100 pounds per square inch.

3. A burner as defined in claim 1 further including a control system having means for controlling the air and gas pressure in the burner by adjusting the air pressure.

4. A combustion system for burning air and gas, comprising:
   an air manifold for receiving the air;
   a gas manifold for receiving the gas, one of said manifolds being disposed within the other;
   aspiration means for combining the air from said air manifold with the gas from said gas manifold and create an air/gas mixture;
   restricting means for creating a turbulent flow and restricting the volumetric flow of the air/gas mixture;
   said aspirating means being juxtaposed to said restricting means, and
   means for preheating the air and gas while inside said air and gas manifolds.

5. A combustion system for burning air and gas comprising:
   an air manifold for receiving the air;
   a gas manifold for receiving the gas;
   first means for uniting the air in said air manifold with the gas in said gas manifold to create an air/gas mixture;
   second means for creating a turbulent flow of the air/gas mixture to cause additional mixing of the air and gas and for restricting the volumetric flow of the air/gas mixture;
   said first means being juxtaposed to said second means, and
   a combustion chamber having a plate, said plate also being a cover for said air and gas manifolds and acting as a heat transfer surface to preheat the air and gas in said air and gas manifolds.

6. A combustion system as defined in claim 5 wherein said plate is sized to provide a predetermined amount of preheat for the air and gas in said air and gas manifolds.

7. A combustion system as defined in claim 4 wherein said aspirating means includes a tube inside said manifolds communicating with said air manifold for the passage of air through said tube; said tube having a plurality of ports therethrough communicating with said gas manifold whereby a aspirating effect is created by the air flow across said ports causing the gas to flow into said tube.

8. A combustion system for burning air and gas comprising:
   an air manifold for receiving the air;
   a gas manifold for receiving the gas;
   first means for uniting the air in said air manifold with the gas in said gas manifold to create an air/gas mixture;
   second means for creating a turbulent flow of the air/gas mixture to cause additional mixing of the air and gas and for restricting the volumetric flow of the air/gas mixture;
   said first means being juxtaposed to said second means;
   said first means including a tube inside said manifolds communicating with said air manifold for the passage of air through said tube; said tube having a plurality of ports therethrough communicating with said gas manifold whereby an aspirating effect is created by the air flow across said ports causing the gas to flow into said tube;
   a combustion chamber having a flue gas exit wherein the cross-section of said flue gas exit is approximately eight times the size of the cross-section of said tube.

9. A combustion system as defined in claim 7 wherein said ports are sized in relation to said tube to permit ample flow of gas into said tube for uniting with the air.

10. A combustion system for burning air and gas comprising:
    an air manifold for receiving the air;
    a gas manifold for receiving the gas;
    first means for uniting the air in said air manifold with the gas in said gas manifold to create an air/gas mixture;
    second means for creating a turbulent flow of the air/gas mixture to cause additional mixing of the air and gas and for restricting the volumetric flow of the air/gas mixture;
    said first means being juxtaposed to said second means;
    said first means including a tube inside said manifolds communicating with said air manifold for the passage of air through said tube; said tube having a plurality of ports therethrough communicating with said gas manifold whereby an aspirating effect is created by the air flow across said ports causing the gas to flow into said tube;
    said second means including diffuser disposed within said tube;
    said air and gas manifolds having a common side which is subjected to the heat of combustion whereby the air and gas within said air and gas manifolds are preheated, said common side engaging said tube and transferring heat thereto.

11. A combustion system as defined in claim 10 wherein said tube, diffuser, and side are made of stainless steel.

12. A combustion system as defined in claim 7 wherein said restricting means includes a diffuser made of a solid piece of stainless steel and attached to only one end of said tube.

13. A combustion system as defined in claim 7 wherein said restricting means disposed within said tube, extends the length thereof, and projects from the downstream end of said tube.

14. A combustion system for burning air and gas comprising:
    an air manifold for receiving the air;
    a gas manifold for receiving the gas;
    first means for uniting the air in said air manifold with the gas in said gas manifold to create an air/gas mixture;

second means for creating a turbulent flow of the air/gas mixture to cause additional mixing of the air and gas and for restricting the volumetric flow of the air/gas mixture;

said first means being juxtaposed to said second means;

said first means including a tube inside said manifolds communicating with said air manifold for the passage of air through said tube; said tube having a plurality of ports therethrough communicating with said gas manifold whereby an aspirating effect is created by the air flow across said ports causing the gas to flow into said tube;

said second means including a diffuser disposed within said tube;

said diffuser having a flattened upstream end, a rod-like mid-portion, and a flared downstream end.

15. A combustion system as defined in claim 14 wherein the sides of said flattened upstream end of said diffuser slidingly engage the internal surface of said tube; said flattened upstream end of said diffuser being attached to said upstream end of said tube.

16. A combustion system as defined in claim 4 wherein said aspirating means includes a tube having a flared internal diameter at the downstream end, and said restricting means includes a diffuser, disposed within said tube, having a flared downstream end, said downstream ends having the same pitch.

17. A combustion system for burning air and gas comprising:

an air manifold for receiving the air;
a gas manifold for receiving the gas;
first means for uniting the air in said air manifold with the gas in said gas manifold to create an air/gas mixture;
second means for creating a turbulent flow of the air/gas mixture to cause additional mixing of the air and gas and for restricting the volumetric flow of the air/gas mixture;
said first means being juxtaposed to said second means;
said first means including a tube communicating with said air manifold for the passage of air through said tube, said tube having a plurality of ports therethrough communicating with said gas manifold creating an aspirating effect;
said aspirating means including a tube within said manifolds and said restricting means including a rod disposed within said tube.

18. A combustion system as defined in claim 17 wherein said rod and tube have complimentary shapes causing turbulent flow.

19. A combustion system as defined in claim 18 wherein said rod has a flattened upstream end, a rod-like midportion, and a flared downstream end, and said tube had a flared downstream internal diameter.

20. A combustion system for burning air and gas thereby creating a flue gas and heating a work piece comprising:

an air manifold for receiving the air;
a gas manifold for receiving the gas, one of said manifolds being disposed within the other;
an aspirating means for uniting the air in said air manifold with the gas in said gas manifold to create an air/gas mixture;
means for creating a turbulent flow of the air/gas mixture to cause additional mixing of the air and gas and for restricting the volumetric flow of the air/gas mixture;
said aspirating means being juxtaposed to said means;
a hearth on which the work piece rest;
a combustion chamber about said hearth; and
means for preheating the air and gas inside said air and gas manifolds.

21. A combustion system as defined in claim 20 wherein said combustion chamber is lined with a refractory of 90% or more pure alumina oxide and further including means for pressurizing the air to a pressure less than 10 psi.

22. A combustion system as defined in claim 20 wherein said combustion chamber is lined with a zirconia refractory and further including means for pressurizing the air to a pressure over 10 psi but less than 25 psi.

23. A combustion system as defined in claim 20 wherein said combustion chamber is lined with a hafnium oxide refractory and further including means for pressurizing the air to a pressure over 25 psi.

24. A combustion system as defined in claim 20 further including means for placing the air under pressure prior to entering said air manifold, said air pressure being sufficient to create a flue gas velocity which causes a back pressure within said combustion chamber whereby the work piece is primarily heated by forced convection.

25. A combustion system as defined in claim 24 wherein said combustion chamber is lined with a refractory which heats the work piece by radiation and said combustion chamber directs the flue gas over the work piece to heat the work piece by forced convection whereby primary heating is by forced convection and secondary heating is by radiation.

26. A combustion system as defined in claim 20 further including means for placing the air under pressure prior to entering said air manifold, said air pressure being sufficient to create a velocity of the flue gas passing around the work piece to cause a back pressure on the work piece.

27. A combustion system as defined in claim 20 further including an air/gas control which regulates the flow of the gas by controlling the flow of the air.

28. A combustion system as defined in claim 20 further including means for placing the air under pressure prior to entering said air manifold, said air pressure being sufficient to create a flue gas velocity of over mach 1 causing a vacuum within said combustion chamber.

29. A method of burning an air/gas mixture including:

passing combustion air into an air manifold;
impinging the air on a mounting plate;
transferring heat from the mounting plate to the air;
forcing the preheated air into the upstream end of an air control pipe;
deflecting the preheated air on a diffuser rod;
flowing the combustion air through the air control pipe at a high velocity;
creating an aspirating effect on gas inlet ports in the air control pipe;
flowing gas into a gas manifold;
preheating the gas by heat transfer from the mounting plate;
causing the gas to flow through ports in the air control pipe due to the aspirating effect caused by the flowing air through the air control pipe;
impinging the gas on the diffuser;

causing turbulence of the air and gas;
entraining the gas in the air;
passing the air/gas mixture through the nozzle formed by the diffuser and air control pipe;
causing greater turbulence in the air/gas mixture;
causing the mixture to leave the nozzle in a fan shaped pattern; and
burning the air/gas mixture at a flame temperature of 3500° F.

30. A method as defined in claim 29 further including:
pressurizing the air prior to entering the air manifold;
creating a flue gas through the burning of the air/gas mixture;
flowing the flue gas through a combustion chamber at a sufficient velocity to cause a back pressure within the combustion chamber;
passing a work piece through the combustion chamber; and
flowing the flue gas around the work piece at a sufficient velocity to cause a back pressure on the work piece.

31. A combustion system for burning air and gas thereby creating a flue gas and heating a work piece comprising:
a single air manifold for receiving the air;
a plurality of gas manifolds for receiving the gas, said gas manifolds being disposed within said single air manifold;
aspirating means disposed in each gas manifold for uniting the air in said air manifold with the gas in said gas manifold to create an air/gas mixture;
means for creating a turbulent flow of the air/gas mixture to cause additional mixing of the air and gas and for restricting the volumetric flow of the air/gas mixture;
said aspirating means being juxtaposed to said last mentioned means;
a combustion chamber into which the work piece projects;
and means for preheating the air and gas inside said air manifold and said gas manifolds.

* * * * *